3,687,877
METHOD OF PRODUCING MOLDED ARTICLES FROM COFFEE BEAN HULLS
Leslie A. Runton, Canton, Mass., assignor to Industria de Cascarillas—CISCANA S.A., Medellin, Colombia, South America
No Drawing. Filed Apr. 29, 1970, Ser. No. 33,049
Int. Cl. B32b 5/16; C08g 51/14
U.S. Cl. 260—17.2                                  6 Claims

ABSTRACT OF THE DISCLOSURE

The method of making a molded product from coffee bean and rice hulls in which the hulls are coated with a phenol formaldehyde resin, cold molded into a preform and then molded under heat and pressure to form a heat set cured product.

---

This invention relates to the production of molded articles from otherwise waste materials such as the coffee bean endocarp, rice hulls or the like and has for an object to provide a novel and improved process for treating and forming such material.

Another object is to provide a commercially useful process of the above type.

Another object is to provide a molded article of the above type having novel and improved characteristics.

Various other objects and advantages will be apparent as the nature of the invention is more fully disclosed.

The endocarp or the vegetable hulls of coffee beans and of grains such as rice are practically waste products and occur in vast quantities. Most of the waste is burned. The coffee bean endocarp contains 54 percent cellulose, 27% pentosans and 19% lignin. Rice hulls are of approximately the same composition except that the cellulose is replaced by 70% of silica ($SiO_2$) with attached $H_2O$, defined as a metalloid compound.

The pentosans and lignin in the coffee bean endocarp and in the rice hulls are compatible resins but are difficult and expensive to remove, as would be necessary for making paper or the like. Hence, these hulls have been generally discarded as waste materials.

A further object of the present invention is to utilize such waste materials and to convert them into a commercially useful product.

In accordance with the present invention it has been found that when comminuted into small particle size, and coated with a thin film of a thermosetting resin which is compatible with the resin content of the endocarp, vegetable hulls such as coffee beans and rice hulls may be cold molded into a hard preform which in turn can be molded under heat and pressure into the final product. The hardness and the specific gravity of the product may be varied according to the particle size and the molding conditions. The strength of the product and its physical characteristics may be varied by varying the relative proportions of coffee bean and rice hulls, their particle size, compaction and distribution in the product.

A particle board which is fire proof and suitable for use in walls or in building construction may be composed at least on its surface of treated rice hulls comminuted to fine particle size. The $SiO_2$ in the rice hulls is noncombustible and the pentosans in the coffee bean endocarp improve the physical strength of the product.

The nature of the invention will be better understood from the following description in which specific examples have been given for purposes of illustration.

The mixture of ground coffee bean hulls and rice hulls is treated with a water solution of a water soluble phenol formaldehyde resin in a manner to form a film of molecular thickness on each particle. This may be accomplished by passing the hull particles suspended in an air stream through a spray of a water solution of the resin or by immersing the hull particles in a water solution of the resin followed by drying the particles to drive off the water and leave a molecular coating of the resin on the particles.

The amount of the coating may be controlled by varying the concentration of the resin in the water solution. A coating of about 1% to 5% by weight of the hulls is usually satisfactory.

The phenol formaldehyde resin is compatible with the resins in the hulls and forms a bond therewith during the curing step.

The coated hull particles from which the water has been largely removed may be placed in a press and cold molded under a pressure of from 1.5 tons to 10 tons per sq. in. Such pressure reduces the volume to about one-fifth of the original volume and causes the resins to flow sufficiently to bond the particles into a hard preform. The density of the preform depends upon the molding pressure. The hardness is such that the preform can be readily handled and after drying is placed in a heated mold for forming the final heat set product.

The preform above described is now molded in a hot mold at a temperature of from 290° F. to 400° F. and under a pressure of about 1.5 tons to 10 tons per sq. in. for a time of from 2 to 15 mins. as required to cause the phenol formaldehyde resin to combine chemically with the resins in the hull particles and to become set and cured. Since such resins are thermosetting in character the product remains permanently hard and does not soften on subsequent heating.

In order to form a fire proof particle board the hull particles may be pre-pressed in layers or laminations.

The rice hulls are placed in the outer layers and the coffee bean hulls are sandwiched therebetween. In such a structure the $SiO_2$ rice hulls form a fireproof outer surface and the cellulosic endocarp of the coffee bean hulls impart strength and rigidity. Of course the degree of fire resistance can be varied by varying the relative percentages of the hulls and their distribution. The random orientation of the cellulosic component produces a uniform strength in all directions and eliminates the unidirectional strength which is common in wood due to its grain.

The product is also useful for furniture parts as it can be readily molded into any desired shape, using small particles and a higher percentage of resin.

Since the final mold remains at uniform temperature the time which would otherwise be required to heat or to cool the mold between molding operations is eliminated with a consequent increase in output. The cost is further reduced because the coffee bean hulls and rice hulls are waste products and are readily available at low cost.

The cold pressing step can be eliminated, as it is only introduced to reduce the total presseing time, and does not in any way effect the process.

Large boards or sheets are preferably made in a tub into which the particles are first vibrated to develop an even distribution, then, in a semi-moist state, cold pressed, removed from the tub and dried at low-temperature such as 180° F. by varying the pressure and the relative proportion of the rice and coffee bean hulls laminates of various density, heat resistance and strength can be built up. Several such prepressed boards can be placed in a hot mould and pressed into one solid laminate, by using the two stage properties of the phenolic resin. Predrying at 180° F. and moulding at 290° to 400°. These laminates can have fire proof exteriors and high strength interior sheets. The face can be formed by using finely reduced particles with additional resin. Additional strength can be obtained by including a metal screen or other fibers between layers of the molded material.

As distinguished from wood particle board made from wood shavings, which has a specific gravity of from 0.4 to 0.9 and consequently will float in water, particle board made from rice and or coffee endocarp in accordance with the present invention will sink in water, and has a specific gravity from 1.0 to 1.10.

Coffee bean and rice hulls do not absorb the bonding resin. Hence, the resin forms a thin surface coating and a relatively small amount such as from 1 to 5% of the weight of the endocarp is sufficient for the purpose. These resins under the high pressure referred to above and under the temperature required for curing are brought into contact with the natural resin in the endocarp and bond thereto to form a relatively strong final product.

What is claimed is:

1. The method of making a molded product from coffee bean hulls, which comprises comminuting said hulls, coating the comminuted hulls with a film of a compatible thermosetting phenol formaldehyde resin which is water soluble in uncured state, by the steps of applying a water solution of said resin to said hulls, drying the same to leave a thin film of said resin on said hulls, said film having a weight of from 1% to 5% of the weight of the hulls and curing the coated hulls at a temperature and pressure adapted to cause the resin to flow and to combine chemically with the resin of the hulls and to cure the resin to heat set state.

2. A molded product consisting essentially of molded and heat set comminuted coffee bean hulls having a coating of a compatible thermosetting pehnol formaldehyde resin chemically bonded to the resin in said hulls and having a weight of from 1% to 5% of the weight of the hulls, said resin being in the cured and heat set state.

3. The method set forth in claim 1 in which a water solution of said resin is sprayed onto said hulls followed by drying the same to leave a resin coating.

4. The method set forth in claim 1 in which the hulls are immersed in a solution of said resin followed by drying the same to leave a resin coating.

5. The method set forth in claim 1 in which the particles are molded under a pressure of from 1.5 to 10 tons per sq. in.

6. The method set forth in claim 1 in which the product is molded at a temperature of from 290° F. to 400° F.

References Cited

UNITED STATES PATENTS

| | | | |
|---|---|---|---|
| 3,554,941 | 1/1971 | Varnell | 260—9 R |
| 2,645,587 | 7/1953 | Williamson | 260—9 R |
| 2,320,649 | 6/1943 | Polin | 260—3 |

OTHER REFERENCES

Chem. Abstract, vol. 52: 782(b), "Rice Hulls—Plastics," Machado.

Chem. Abstract, vol. 53: 16585(a), "Filler—Adhesives—Rice Husks," Narayanamurti et al.

WILLIAM H. SHORT, Primary Examiner

E. WOODBERRY, Assistant Examiner

U.S. Cl. X.R.

161—168; 264—120